Figure 1:
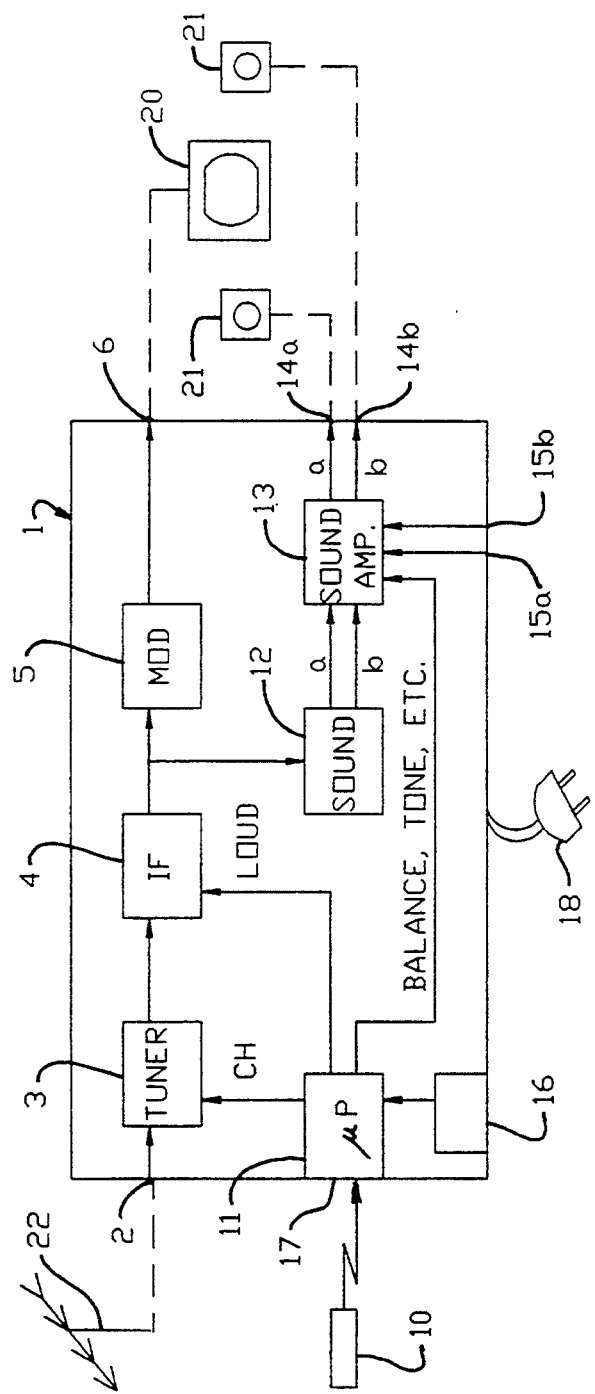

United States Patent [19]
Powell

[11] Patent Number: 5,333,056
[45] Date of Patent: Jul. 26, 1994

[54] TELEVISION SIGNAL CONVERTER PROVIDING SEPARATE STEREO SOUND OUTPUTS

[76] Inventor: Roger A. Powell, 1740 Hollins Rd., Bensalem, Pa. 19020

[21] Appl. No.: 682,549

[22] Filed: Apr. 9, 1991

[51] Int. Cl.$^5$ ............................................. H04N 5/60
[52] U.S. Cl. ...................... 348/758; 455/6.2; 348/485; 348/734
[58] Field of Search .............. 358/194.1, 198, 197, 358/86, 144; 455/3, 4, 6; 381/2; H04N 5/60

[56] References Cited

U.S. PATENT DOCUMENTS

| | | | |
|---|---|---|---|
| 3,936,594 | 2/1976 | Schubin et al. | 358/144 |
| 4,257,067 | 3/1981 | Christopher | 358/189 |
| 4,396,949 | 8/1983 | Meguro et al. | 358/198 |
| 4,571,622 | 2/1986 | Davidov et al. | 358/197 |
| 4,603,349 | 7/1986 | Robbins | 358/86 |
| 4,633,495 | 12/1986 | Schotz | 381/3 |
| 4,748,501 | 5/1988 | Long | 358/198 |
| 4,907,082 | 3/1990 | Richards | 358/194.1 |
| 4,996,597 | 2/1991 | Duffield | 358/194.1 |
| 5,054,071 | 10/1991 | Bacon | 455/4 |
| 5,130,803 | 7/1992 | Kurita et al. | 358/198 |

FOREIGN PATENT DOCUMENTS

| | | | |
|---|---|---|---|
| 0007780 | 1/1986 | Japan | 358/198 |
| 0130084 | 6/1987 | Japan | H04N 5/60 |

*Primary Examiner*—Mark R. Powell
*Assistant Examiner*—Jeffrey S. Murrell

[57] ABSTRACT

A television signal processor box that processes a standard incoming television signal to provide frequency channel selection, remote control capability, stereo sound separation and amplification on multiple output terminals suitable for direct connection to commercially available sound speakers, and a standard format television signal on a predetermined frequency channel for input to a standard television set without stereo sound capability.

6 Claims, 1 Drawing Sheet

TELEVISION SIGNAL CONVERTER PROVIDING SEPARATE STEREO SOUND OUTPUTS

BACKGROUND OF THE INVENTION

This invention relates generally to a television signal processor box that processes television signals prior to their reception by a television set, and particularly to television signals that contain stereo sound signals.

Recently, television transmissions signals have begun to include information that can be processed to produce stereo sound on two or more separate sound channels. These transmission signals are broadcast over the air and/or transmitted by cable. To reproduce the stereo sound, the receiving television set or auxiliary equipment must have the necessary electronics to be capable of processing the signal to separate the two sound channels. This requires that existing non-stereo television sets or non-stereo auxiliary equipment such as video cassette recorders (VCR) must be discarded and replaced with new equipment to acquire the stereo sound capability.

Several approaches have been suggested to mitigate this situation while recognizing that the frequency channel selection must be performed before the stereo sound is separated from the selected frequency channel signal. One approach is to incorporate the stereo sound separation into a cable television converter box which provides the frequency channel selection, such as U.S. Pat. No. 4,748,501 to Long. This invention is an improvement on cable converter boxes in that it separates the stereo sound into an intermediate signal. But, this intermediate signal requires an additional stereo audio adapter prior to connection to sound speakers, or alternatively, a stereo television for use. It also would require access to a cable television input. These requirements limit the usefulness of this device. Another approach is to capture the stereo sound signal within the television set after the tuner has selected the frequency channel. This requires a "field modification" to the television set which is cumbersome, or a remote local pickup probe as in U.S. Pat. No. 4,633,495 to Schotz. This system relies on picking up spurious signals that are leaked from the normal television circuits without direct electrical connection.

Therefore, it is advantageous if a separate television signal processor box, which could receive any standard television format signals from any source, could be added to an existing non-stereo television set to provide stereo sound. Further, since a number of existing non-stereo television sets do not have a hand-held remote control capability, it would be advantageous to incorporate remote control capability into the television signal processor box, since frequency channel selection must already be performed within the box. Further, it would be advantageous if the television signal processor box did not require additional equipment to interface with the sound speakers; i.e. all the amplification required by the speakers is built into the television signal processing box. This has the further advantage of allowing the user to select the sound speakers consistent with his audio preferences and allowing the user to place the separate speakers at the optimal location and separation. Further, it would be advantageous if the television signal processor box has input connections for stereo sound that is already separated into several sound channels. This would facilitate the use of a VCR or cable converter that separates the stereo sound portion from the video portion of the television signal and provides it on separate sound channels.

OBJECTS OF THE INVENTION

An object of the invention is to provide a television signal processor box that could receive any standard television format input signal from any source and could be connected to an existing non-stereo television set to provide stereo sound capability. Another object is to provide remote control capability in the television signal processor box system. Another object is to provide the necessary amplification in the television signal processor box so that commercially available speakers can be directly attached to the stereo sound output terminals. Another object is to accept and process multi-channel stereo sound input signals into multi-channel stereo sound outputs with sufficient power to drive commercially available sound speakers. Further objects and advantages of the invention will be apparent upon reading the following description in conjunction with the drawing.

SUMMARY OF THE INVENTION

In accordance with the invention, a television signal processor box receives television transmission signals that contain stereo sound information and which represent VHF and/or UHF frequency channels in the standard format that is well-known. The television signal processor box also receives user instruction commands defining channel selection and sound parameter values. The television signal processor box transmits the selected video and associated sound signal on a predetermined frequency channel (typically channel 3 or 4) to a television set. The television signal processor box also provides multi-channel stereo sound outputs on separate terminals that are suitable for direct connection to commercially available sound speakers.

BRIEF DESCRIPTION TO THE DRAWINGS

FIG. 1 is a block diagram of the television signal processor box in accordance with this invention.

DESCRIPTION OF THE INVENTION

In FIG. 1, the television signal processor box 1, has a television input connector 2 for receiving input television signals from an antenna 22, cable convertor (not shown), video cassette recorder (VCR) (not shown), or other device which provides the standard television broadcast frequency and format and which contains a video portion and a stereo sound portion. The television signal processor box 1 has an external interface 17 that is connected to an internal microprocessor 11. The external interface 17 responds to signals from a remote control device 10. These signals are typically in the infrared range of the spectrum and these remote control systems are well-known in the art. The remote control device 10 is operated by the human user of the system. The user may input commands (typically through pushbuttons) into the remote control device 10; such as: power on/off, channel selection, loudness, stereo balance, tone, etc. Alternatively, some or all of these choices may be entered by the user by means of external controls 16 on the television signal processing box 1. These external controls 16 may be pushbuttons, knobs, etc. which are connected to the microprocessor 11. The microprocessor 11 upon receiving these signals converts them to compatible forms and transmits them to the tuner 3, the intermediate frequency amplifier 4, and the sound amplifier 13. Alternatively, the external controls 16 could produce inputs that are compatible with the tuner 3, the intermediate frequency amplifier 4, and the sound amplifier 13 and could be directly connected to them, thereby eliminating the need for the microprocessor 11 and the remote control device 10. The television processor box 1 receives electrical power from a standard wall plug 18, typically 120 vac, 60 hertz.

The television signal, containing a video portion and stereo sound portion, received at the television input connector 2 is electrically coupled to the tuner 3. The tuner 3 also receives frequency channel selection input from the microprocessor 11. The tuner 3 selects the desired frequency channel and transmits that frequency channel's signal as an intermediate frequency (IF) signal to the intermediate frequency (IF) amplifier 4. The intermediate frequency amplifier 4 also receives a loudness control input from the microprocessor 11. The intermediate frequency amplifier 4 amplifies the signal and transmits it to the modulator 5 which converts the signal to an output that is in the standard television format and frequency for a predetermined frequency channel (typically channel 3 or channel 4) and which contains the video portion and the sound portion. The details of the foregoing circuit are well known in the art, as incorporated in many VCRs. This output is coupled to the television output terminal 6 to which may be connected a television set 20. The television set 20 is tuned to a predetermined channel (typically channel 3 or channel 4) and will display and frequency channel selected by the user after processing by the television signal processing box 1.

The electrical signal conductor between the intermediate frequency amplifier 4 and the modulator 5 is also electrically coupled to the sound section 12. The sound section 12 processes the incoming signal to produce at least two stereo sound channels of output that are transmitted to the sound amplifier 13. The sound amplifier also receives input from the microprocessor 11 which selects balance, tone, etc. The sound amplifier 13 may also receive loudness information from the microprocessor. The sound amplifier 13 amplifies the input sound signals in a conventional manner that is well-known, as used in audio equipment, and transmits the amplified signals to the stereo output connections 14a,14b. The amplified signals at the stereo output connections 14a,14b have sufficient power that they may be directly connected to commercially available speakers 21; no additional amplification components are required. This is typically in the range of 5 to 50 watts per channel output.

The television signal processor box 1 also has stereo input connections 15a,15b which can receive multi-channel stereo sound signals from another device such as a cable convertor or VCR that has performed the sound stereo separation. The stereo sound input signals are transmitted to the sound amplifier 13 which processes them in accordance with the balance, tone, etc. selections or commands from the user, resulting in multi-channel stereo sound outputs at the connections 14a,14b.

To use this device, the user would connect the incoming television signal to the input connector 2; connect the television output connection 6 to a television set 20 with its tuner set to a predetermined frequency channel (channel 3 or 4); insert the wall plug 18 into a 120 vac supply socket; and connect the stereo output connections 14a,14b each to a speaker 21 which are placed on either side of the television set 20. The user would operate the remote control device 10 to select the frequency channel, volume, balance, tone, etc.

Changes and modifications in the specifically described embodiments can be carried out without departing from the scope of the invention which is intended to be limited only by the scope of the appended claims.

I claim:

1. A television signal converter box for processing a television signal having a video portion and a stereo sound portion in standard broadcast frequency and format, comprising;

an external input connection for receiving said television signal coupled to a tuner, said tuner receiving said television signal and receiving channel selection information, said tuner transmitting an intermediate frequency signal to an intermediate frequency amplifier, said intermediate frequency amplifier amplifying said intermediate frequency signal and transmitting said signal to a modulator, said modulator converting said amplified intermediate frequency signal to a standard television format signal on a predetermined frequency and transmitting said standard television format signal to an external video output terminal, said standard television format signal at said external video output terminal being suitable for direct connection as input to a standard television set having a video display tube and monaural sound capability, a sound section coupled to said intermediate frequency amplifier, said sound section separating said stereo sound portion into a plurality of sound signals on a plurality of electrical conductors, said sound section amplifying and transmitting said plurality of sound signals to a plurality of external sound output connections, said sound section providing sufficient amplification of said plurality of sound signals to allow direct connection and acceptable performance of commercially-available sound speakers to said plurality of external sound output connections, an external box enclosing said tuner, said intermediate frequency amplifier, said modulator, and said sound section, said external box providing structural mounting support for said external input connection, said external video output terminal, and said plurality of external sound output connections, said external box being separate from said standard television set.

2. A television signal converter box according to claim 1, further comprising a remote control device which transmits user command signals to said television signal converter box.

3. A television signal converter box according to claim 2, wherein said remote control device transmits user command signals that include sound parameter values.

4. A television signal converter box according to claim 1, wherein said sound section includes a sound amplifier that receives input sound signals on two channels, amplifies each channel in accordance with user commanded sound parameter values, and transmits each channel of stereo sound to an external sound output connection.

5. A television signal converter box according to claim 1, further comprising a microprocessor that processes user command inputs to produce control inputs to said tuner and said sound section.

6. A television signal converter box according to claim 1, further comprising a plurality of input sound connections to said sound section for amplification and transmission to said plurality of external sound output connections.

* * * * *